United States Patent [19]

Bauer

[11] 3,725,315
[45] Apr. 3, 1973

[54] METHOD FOR MAKING AN INSULATING BODY

[75] Inventor: Peter Bauer, Darmstadt, Germany

[73] Assignee: Rohm & Haas G.m.b.H., Darmstadt, Germany

[22] Filed: Nov. 6, 1970

[21] Appl. No.: 87,580

[30] Foreign Application Priority Data

Nov. 18, 1969 Germany .................... P 19 57 820.2

[52] U.S. Cl. .......... 260/2.5 B, 260/2.5 N, 260/2.5 EP, 260/2.5 F, 260/2.5 R, 260/28.5 AS, 260/33.6 UA, 260/33.8 UA, 260/80.73, 260/85.5 R, 260/85.5 S
[51] Int. Cl. ..................... C08f 47/10, C08f 45/52
[58] Field of Search .......... 260/2.5 B, 2.5 R, 28.5 AS, 260/2.5 N, 2.5 F

[56] References Cited

UNITED STATES PATENTS

| 2,888,407 | 5/1959 | Cooper et al. | 260/2.5 HB |
|---|---|---|---|
| 3,591,531 | 7/1971 | Schroeder et al. | 260/2.5 N |

FOREIGN PATENTS OR APPLICATIONS

| 851,763 | 9/1970 | Canada | 260/28.5 AS |
|---|---|---|---|
| 1,245,597 | 7/1967 | Germany | 260/2.5 R |

Primary Examiner—Samuel H. Blech
Assistant Examiner—Wilbert J. Briggs, Sr.
Attorney—Curtis, Morris & Safford

[57] ABSTRACT

A method of making insulating bodies by dispersing a resin, foamable at a temperature from about 150°C. to about 250°C., in molten asphalt maintained at these temperatures until foaming is complete, and then cooling the mixture.

6 Claims, No Drawings

METHOD FOR MAKING AN INSULATING BODY

The present invention relates to methods for making an insulating body, and relates in particular to methods for making an insulating body from asphalt and a foamable synthetic resin.

The construction industry employs porous materials bound together with asphalt as bodies insulating against heat or cold. These bodies are prepared by surrounding small pieces of a porous material such as cork or polystyrene with melted asphalt and, while hot, pouring the material or spraying it onto a wall and letting it solidify.

This method has the disadvantage that the porous material occupies much space in storage and transport. The low density of the porous material also makes it extraordinarily difficult to mix the material uniformly with asphalt and to coat it without defects in the coating. However, just such a defect-free coating is often urgently necessary as a barrier to the penetration of moisture into the cell structure.

Certain of these disadvantages are avoided by the method of German Patent publication 1,219,221. According to this patent, particles of foamable polystyrene are mixed with an asphalt melting above room temperature and then are foamed by heating. The unfoamed polystyrene occupies less space in storage and transport. It can be mixed well with molten asphalt and is completely coated by it. Nevertheless, there is the disadvantage that the resultant mass can be softened at very low temperatures, for example even when struck by sunlight. This is because in order to be able to work the body without difficulty after the foaming of the polystyrene particles, those kinds of asphalt must be employed which are relatively fluid at temperatures beneath the softening point of the polystyrene. The softening points of these asphalts, as determined by the ring-and-ball method (DIN 1995/U 3), cannot be higher than about 40°C.

For this reason, attempts have already been made to raise the melting point of the asphalt during working by cross-linking. German Patent publication 1,245,597 describes a procedure for the preparation of polyvinyl chloride foam in an asphalt matrix, wherein the asphalt is hardened by polyisocyanate. A mass prepared in this manner will remain rigid at temperatures to 75°C., but this heat stability still is dependent on the softening point of the plastic.

The present invention solves the problem of preparing an insulating body from an asphalt-bound foamed material. The volume of the raw materials employed is small, the method of preparation is simple, and the insulating body prepared is heat-stable at temperatures considerably above 100°C. According to the invention, a plastic or resin which foams and hardens at temperatures between 150°C. and 230°C. is heated and foamed, in granular form, in asphalt at 150°C. – 230°C. The body is then permitted to solidify. By "hardening" is meant the known behavior of heat-hardenable synthetic resins for which, on heating, the softening point increases sharply or which become infusible. This phenomenon is generally associated with an inter- or intra-molecular cross-linking reaction.

By the use of a heat-hardenable synthetic resin, it is possible to employ high-melting asphalts and to work at temperatures at which the resin, in its non-cross-linked condition, is thermoplastic and foamable. Nevertheless, the resin is so rigid after foaming and simultaneous hardening that on cooling the asphalt there is no change in the form or volume of the foamed particles. In the most favorable cases, the resin should remain thermoplastic at temperatures between 150°C. and 230°C. just long enough to foam to the desired degree, but should then harden to such an extent that the foam formed at the end of the hardening process at the foaming temperature is beneath the thermoplastic temperature region.

Synthetic resins which foam at 150°C. – 230°C. and which simultaneously harden with cross-linking are known in the art. For example, they are made according to Belgian Patent 717,958 by copolymerization of isopropenylphenyldimethyl carbinol with other unsaturated monomers in the presence of a blowing agent. At temperatures of 150°C. – 220°C., the isopropenylphenyl-dimethyl carbinol units form unsaturated groups by cleavage of water. By polymerization under the influence of free radical-forming additives, these groups lead to a cross-linking and hardening of the polymer.

However, in using the present invention, there is no restriction to the use of known foamable and hardenable resins. A large number of non-foaming heat-hardenable resins are known which can be made foamable by the addition of a blowing agent such as azobisisobutyronitrile. The common characteristic of resins of this kind is the presence of reactive groups which lead to an intermolecular cross-linking at temperatures of 150°C. – 230°C. Suitable hardenable resins predominantly containing styrene, vinyl esters, or lower esters of methacrylic acid can be prepared having as cross-linking groups a small number of units of methacrylic acid methylol ether amides and methacrylamide or, alternatively, the corresponding acrylic compounds, suitably in combination with acrylic acid or methacrylic acid units. Polymers containing hydroxy groups or amino groups can be made cross-linkable by the addition of polyisocyanates or epoxy resins. In the same way thermoplastic phenolic resin pre-condensates or melamine resin pre-condensates (which, for example, are commercially available, in powdered form), or powdered epoxy resins, can be combined with a preferably solid, powdered blowing agent such as urea, and can then be compacted into granules for use in the process of the present invention.

As blowing agents, materials which vaporize at temperatures from 150°C. – 230°C. are employed. Those materials which irreversibly decompose in this temperature region with the formation of gas are preferred. Numerous organic liquids such as benzene, chlorohydrocarbons, and fluorochlorohydrocarbons are of the first kind, while well-known representatives of the second kind include ammonium bicarbonate (optionally in combination with an acid), urea, trichloroacetic acid, formic acid, azodicarbonamide, and azobisisobutyronitrile. In most cases, it is possible to add the blowing agent during the preparation of the hardenable plastic. The preparation of the foamable heat-hardenable plastic is not within the scope of the present invention. More detailed discussions may be found in the extensive prior art in this field.

Those polymers which on heating above 150°C. form acrylimide units or methacrylimide units of the formula

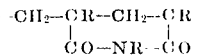

wherein R is hydrogen or methyl, are particularly suitable for the process of the present invention. Foamed polymers entirely or predominantly comprising units of the above formula are characterized by heat stability (maintenance of rigidity) at temperatures of 150°C. – 200°C., high compressive strength, and by an exceptional resistance to organic solvents. They are obtained by heating copolymers of acrylic acid or methacrylic acid with acrylonitrile or methacrylonitrile and/or acrylamide or methacrylamide. The preparation of polymers of this type, with the addition of blowing agents which permit foaming at temperatures of from 150°C. – 230°C., is described in British Patents 1,045,229 and 1,078,425. These patents teach the use of itaconic acid, maleic acid anhydride, citric acid, trichloroacetic acid, urea, dimethylurea, thiourea, dicyandiamide, chloral hydrate, and water as blowing agents. Among the foamable resins disclosed, those which contain at least 20 percent by weight of acrylic acid or methacrylic acid, optionally with one or more further unsaturated monomers (preferably a nitrile or amide of acrylic acid or methacrylic acid), and which contain urea, dimethylurea, formamide, or monomethylformamide as the blowing agent, are especially preferred. Resins of this type can be readily prepared, are particularly resistant to heat, and have excellent mechanical strength.

For preparing insulating bodies according to the process of the invention, the foamable resin is employed in granulated form. A ground material having a maximum granule diameter of about 4 mm – 5 mm and a somewhat spherical form is most suitable. The less uniform the material is from the point of view of granule size distribution, the more dense and more uniform is the insulating body obtained. When the foamable resin is ground to form granules, a granulate having more or less variable particle size is formed, part of which may strongly deviate from the desired spherical form, depending on the kind of mill employed. For the majority of uses, such a material can be employed without further treatment. Because of the small volume of enclosed voids, the density of the finished insulating bodies, as well as their load strength, is greater than if a very uniform granulate is employed. If, for any reason a large volume of voids is desired in the insulating bodies, then it is of advantage to separate the granulated product into sieve fractions of different particle size and to employ each size alone. The small particles, that is up to 2 mm in diameter, are most suitable for thin insulating layers, for example from 0.5 – 1 cm thick. For very thick layers of 5 cm or more, granule fractions up to 8 mm in diameter can be used. In order to obtain more or less spherical granules, the granulate can be treated for an extended period in a suitable mill in order to rub off projecting corners and edges of the individual granules. The disadvantage of this process lies in the formation of considerable amounts of a very fine residue which can only be used under certain conditions.

The final density of the foamed particles has a considerable influence on the properties of the insulating body, particularly its compression resistance. The density is determined by the composition of the foamable resin, particularly by its content of blowing agent, and by the temperature to which it is heated. At equal foaming temperatures, a lower final density is produced the higher the content of blowing agent. As the foaming temperature falls, the final density also decreases. The content of blowing agent and the foaming temperature are suitably chosen with respect to one another so that the foamed particles have a bulk density from 30 to 100 g/liter. These density limits include such values of density, insulating effect, and compression resistance as are most suitable for the majority of applications. Higher or lower values will be useful only in particular cases. For insulating bodies of high load strength, such as are used under street pavement, factory floors, and the like, the bulk density is advantageously chosen in a range from 60 to 100 g/liter. When used as a foundation for a floating Estrich (gypsum) flooring in residences or office buildings, intermediate densities are sufficient. Still lower densities or bulk densities are sufficient for traversable roof insulation to be covered with tar paper, or for wall insulation that is not load-bearing.

Although in principle it is possible to heat the components of the insulating mass together, in practice the asphalt is first heated to a temperature sufficient to effect foaming of the granulated foamable resin. This temperature, according to the invention, is from about 150°C. to about 230°C. The cold or, optionally, somewhat pre-warmed granulate is then introduced. For a cubic meter of the insulating material, from 60 to 150 kg, preferably from 90 to 110 kg, of asphalt are employed together with — according to the desired final density — 25 – 100 kg of the granulated foamable resin.

In the unfoamed state, the resin has a higher density than the asphalt. Therefore, it sinks in the heated fluid asphalt and is thoroughly coated thereby. The asphalt layer on the particles does not open during the foaming process, so that the final foamed particles are coated with an asphalt layer free of defects. It is recommended that the total mass of granulate be mixed with the asphalt at one time since the addition of material after the foaming process has already begun will not assure the formation of a defect-free coating on the resin particles. Foaming beings a few minutes after introduction of the granulate. Since heat transfer in the mass decreases sharply during foaming, the mass should be vigorously, preferably continually, agitated on further heating. Any desired stirring apparatus can be used for this purpose. However, it is advantageous to employ a heatable rotatable mixing drum. Apparatus of this type is widely used in the industry for handling asphalt. As a rule, the resin is fully foamed after 20 to 40 minutes.

In principle, all types of asphalts and bitumens, natural and synthetic, can be employed in the present invention. (The term "asphalt" as used in the specification and claims is used synonymously with "bitumen", but is not restricted to those mixtures of asphalts or bitumens with gravel, crushed rock, or the like, used for paving which are also sometimes called asphalt). Materials having low softening points can be employed when the temperature needed for foaming the foamable resin is near the lower end of the foaming range, i.e. 150°C., but may be unsuitable at higher temperatures approaching the flash point of the materials. Of course, the asphalts should retain their stability at the temperatures used for foaming for a time sufficient to complete the foaming, that is, for about one-half hour as a rule. Also, an asphalt should be employed keeping in mind the demands of the conditions of usage to which the finished insulating mass will be put. Preferred asphalts are those having a ring-and-ball softening point (DIN 1995/U 3) between about 70°C. and about 85°C. Preferred materials have a penetration at 25°C. (DIN 1995/U 4) from about 23/10 mm to about 33/10 mm. Air-blown and high-vacuum asphalts are also among the materials preferred for use in the invention. For a high degree of heat stability, the use of double-blown asphalt is advantageous.

The completed insulating body is introduced hot into a form or applied directly to the surface to be insulated, smoothed, and left to cool. Cooling may be hastened by pouring water over the surface. Shaped pieces of insulation which are not to be employed at the place of preparation can be prepared in a wooden form which is thoroughly wetted before introducing the mass in order to hinder adhesion. On chilling with water, the shaped piece becomes solid so quickly that it can be taken from the form after a few minutes. The shaped parts can be joined to each other or to a substrate with hot asphalt at the place where they are used.

Preferably, an insulating body is prepared directly at the site where it is to be used. In this way, the fact that the raw materials have only one-fifth to one-tenth of the volume of the finished material can be exploited to advantage. In order to achieve good adhesion to a substrate, the body is suitably put on a foundation which has been covered with asphalt. The adhered insulating body can be smoothed by rolling or tamping as soon as it is sufficiently cooled. Insulating bodies comprising heat-hardenable foams, particularly methacrylimide foams, can be rolled and tamped almost immediately.

The foamed resins comprising acrylimide or methacrylimide, described above in more complete detail, attain their best mechanical properties after an extended period of heating beyond the time required for final foaming. This post0heating can be accomplished in the process of the present invention by permitting the mass of resin and asphalt to remain for a sufficiently long time in the mixing vessel. Because of its low heat conductivity, the mass after pouring will remain sufficiently long at the hardening temperature without external heating.

A better understanding of the present invention and of its many advantages will be had by referring to the following specific example, given by way of illustration.

EXAMPLE 1

100 kg of an asphalt having a ring-and-ball softening point of 100°C. – 108°C. and a penetration of 25/10 mm were introduced into a heatable mixing vessel and heated to 220°C. 70 kg of a material prepared by polymerizing a mixture of 40 parts by weight of methacrylonitrile, 60 parts by weight of methacrylic acid, 5 parts by weight of urea, and 1.1 parts by weight of formamide for 25 hours at 60°C. in the presence of 0.2 part by weight of dibenzoyl peroxide, followed by tempering for 3 hours at 115°C. and granulation, was added to the heated asphalt with stirring.

On further stirring and mixing, 1 cubic meter of a pourable insulating mass having a crude density of 170 kg/m$^3$ was produced by the foaming of the granulate over a period of a half-hour. After cooling to about 170°C., the mass can be applied onto rough concrete flooring, onto gravel, into a trough in the ground, or into wet wooden forms for the preparation of wall-plates, and then can be smoothed and compacted by careful tamping or rolling. The insulating layer prepared in this manner comprises about 10 to 20 volume percent of interconnecting voids, and because of this is permeable to water.

What is claimed is:

1. In a method for making an insulating body by dispersing foamable granules of a synthetic resin in molten asphalt, said foamable granules comprising a blowing agent therein, maintaining a temperature sufficient to foam said resin granules, and cooling, the improvement wherein granules of a synthetic resin which foams and heat hardens at a temperature between about 150°C. and 230°C. is dispersed, foamed, and hardened in molten asphalt at a temperature within the aforementioned range.

2. A method as in claim 1 wherein said foamable granules comprise a copolymer of acrylic or methacrylic acid with acrylonitrile or methacrylonitrile in admixture with a blowing agent.

3. A method as in claim 2 wherein said blowing agent is urea, dimethyl urea, formamide, or monomethyl formamide.

4. A method as in claim 2 wherein said copolymer additionally comprises acrylamide or methacrylamide.

5. A method as in claim 4 wherein said blowing agent is urea, dimethyl urea, formamide, or monomethyl formamide.

6. A method as in claim 1 wherein 90 – 110 parts by weight of asphalt are combined with 25 – 100 parts by weight of granulated resin.

* * * * *